(12) United States Patent
Brenneman et al.

(10) Patent No.: US 9,465,656 B2
(45) Date of Patent: Oct. 11, 2016

(54) SCHEDULER PENALTY FOR SWAPPING ACTIVITY

(75) Inventors: Robert J. Brenneman, Stormville, NY (US); Eli M. Dow, Poughkeepsie, NY (US); William J. Huie, Herndon, VA (US); Sarah J. Sheppard, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1612 days.

(21) Appl. No.: 12/416,629

(22) Filed: Apr. 1, 2009

(65) Prior Publication Data
US 2010/0257530 A1 Oct. 7, 2010

(51) Int. Cl.
*G06F 9/40* (2006.01)
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | |
|---|---|---|---|
| 5,159,678 A | 10/1992 | Wengelski et al. | |
| 5,287,508 A | 2/1994 | Hejna, Jr. et al. | |
| 6,216,109 B1 | 4/2001 | Zweben et al. | |
| 6,978,466 B2 * | 12/2005 | Kerly | 719/332 |
| 7,340,328 B2 | 3/2008 | Matheson et al. | |
| 2009/0287571 A1 * | 11/2009 | Fujioka | 705/14.54 |

OTHER PUBLICATIONS

Nikolopoulos; Adaptive scheduling under memory constraints on non-dedicated computational farms; 2003.*
Pruning-Based, Energy-Optimal, Deterministic I/O Device Scheduling for Hard Real-Time Systems, [online]; [retrieved on Mar. 31, 2009] retrieved from the Internet http://www.dtic.mil/cgi-bin/GetTRDoc?AD=ADA440911&Location=U2&doc=GetTRDoc.pdf.
Hardware-Modulated Parallelism in Chip Microprocessors, [online]; [retrieved on Mar. 31, 2009]; retrieved form the Internet http://www.princeton.edu/~peh/publications/ndp_dasCMP.pdf.
Lee et al., 'Precise and Realistic Utility Functions for User-Centric Performance Analysis of Schedulers', HDPC '07, Jun. 25-29, 2007, Monterey, California, USA. pp. 107-116.
Reddy et al., 'Disk Scheduling in a Multimedia I/O System', ACM Transactions on Multimedia Computing, Communications and Applications, vol. 1, No. 1, Feb. 2005, pp. 37-59.
IBM, 'A 'Sleep on Watermark' Method for Managing Virtual Memory Overcommits Via', IP.com Electronic Publication IPCOM000175777D, Oct. 24, 2008.

* cited by examiner

*Primary Examiner* — Corey S Faherty
(74) *Attorney, Agent, or Firm* — Cantor Colburn LLP; Steven Chiu

(57) ABSTRACT

Methods, systems and computer program products for scheduler penalty for swapping activity. Exemplary embodiments include a memory management method, including identifying a first process from an active queue, identifying a second process from the active queue, tracking attributes associated with the first and second processes, determining whether at least one of the first and second processes are constraining system memory and penalizing at least one of the first and second processes in response to at least one of the first and second processes constraining the system memory.

20 Claims, 3 Drawing Sheets

SCHEDULER PENALTY FOR SWAPPING ACTIVITY

BACKGROUND

The present invention relates to task scheduling, and more specifically, to methods, systems and computer program products for determining penalization for swapping activity.

Operating systems currently have difficulties dealing with "out of memory" conditions, or in situations when memory limitations are approached. For example if a first process consumes a substantial amount of real memory, and then a second process then consumers a substantial amount of memory, both processes can access swap space on a storage medium (e.g., the hard disk of the computer). When this event occurs, much of the processing time is spent moving process in and out of RAM and it is difficult to run any other tasks, and the system slows to a crawl. For example, the system scheduler can initiate fair share scheduling in which the processes are run sequentially, taking turns accessing the swap area of the storage medium. However, this scheduling can degrade and slow down system performance. As such, there doesn't currently exist many peaceful ways to achieve system stability.

SUMMARY

Exemplary embodiments include a memory management method, including identifying a first process from an active queue, identifying a second process from the active queue, tracking attributes associated with the first and second processes, determining whether at least one of the first and second processes are constraining system memory and penalizing, with respect to interactivity, at least one of the first and second processes in response to at least one of the first and second processes constraining the system memory.

Exemplary embodiments further include a memory management system including a processor, a memory operatively coupled to the processor, an active queue residing in the memory, the active queue including processes configure to be run by the processor and to access the memory, an expired queue residing in the memory and a penalty queue residing in the memory.

Exemplary embodiments further include a computer program product for providing memory management, the computer program product including instructions for causing a computer to implement a method, the method including identifying a first process from an active queue, identifying a second process from the active queue, tracking attributes associated with the first and second processes, determining whether at least one of the first and second processes are constraining system memory and penalizing at least one of the first and second processes in response to at least one of the first and second processes constraining the system memory by altering the offending process execution patterns.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the methods, systems and computer program products described herein modify an operating system scheduler to penalize processes that require large amounts of memory that must be backed by a slower form of storage in the storage hierarchy (for instance solid disk storage on many commodity computing devices), many of which may be persistent. In exemplary embodiments, the methods, systems and computer program products described herein mitigate the rapid oscillations, which can occur between accessing real memory and memory backed by slower forms of persistent storage. In addition, although some disk space is designated exclusively for "swap space" there is likely further available space on the disk. In exemplary embodiments, the operating system can be extended to "freeze" processes to the disk and "thaw" them when real memory is available.

Figure 1:
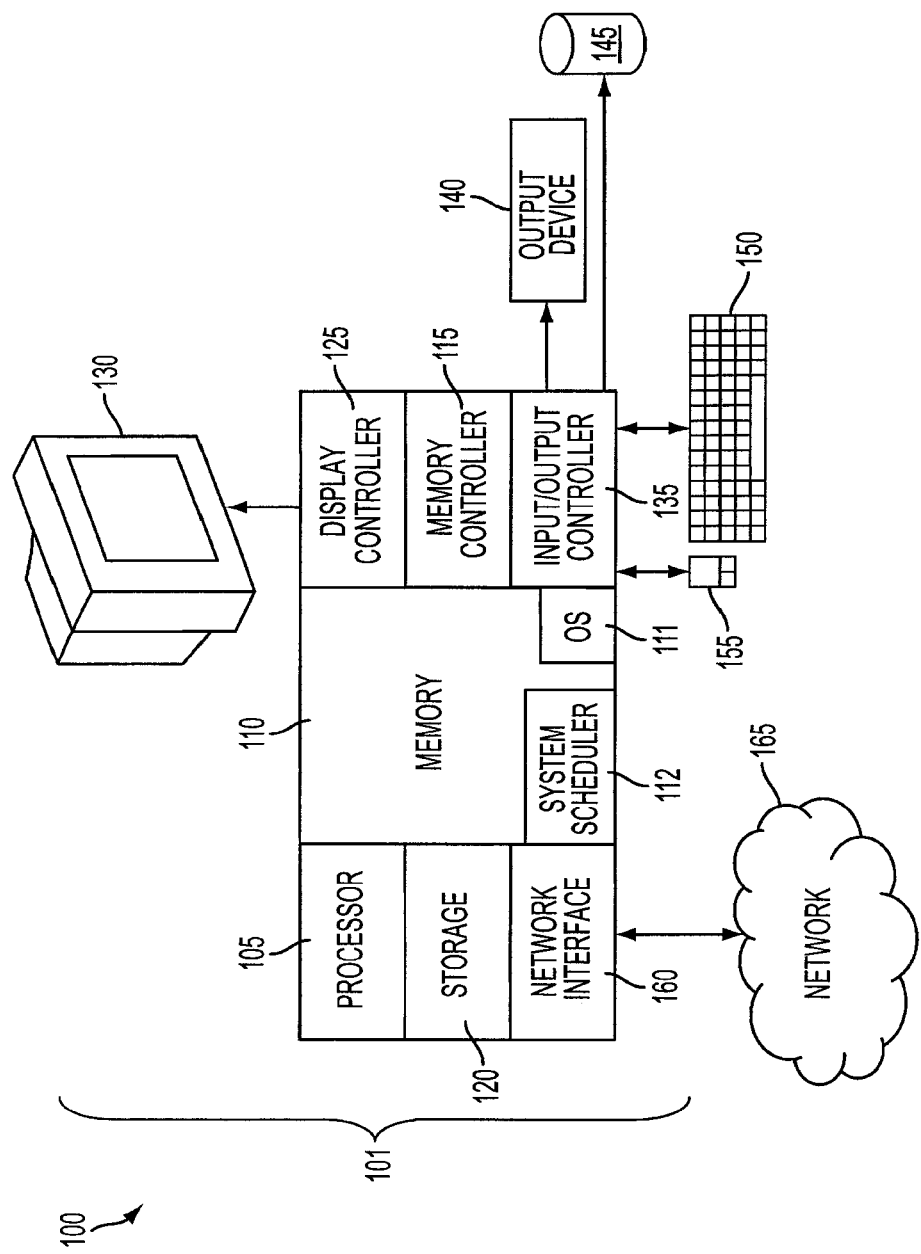
FIG. 1 illustrates an exemplary embodiment of a system for implementing scheduler penalization for swapping activity.

FIG. 1 illustrates an exemplary embodiment of a system 100 for implementing scheduler penalization for swapping activity. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the swapping activity penalization methods described herein in accordance with exemplary embodiments and a suitable operating system (OS) 111. The operating system 111 essentially controls the execution of other computer programs, such the swapping activity penalization systems and methods described herein, and provides scheduling, input-output control, file and data management, memory management, and communication control and related services. As such, the memory 110 can further include a system scheduler 112 configured to initiate and control schedules for processes in the memory 110 and to initiate penalization for those processes in the memory 110 that consume too much memory and have become "swappy".

The swapping activity penalization methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the swapping activity penalization methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The swapping activity penalization methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The swapping activity penalization methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the swapping activity penalization methods are implemented in hardware, the swapping activity penalization methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, by modifying the system scheduler 112 to penalize processes, which are "swappy" in nature (i.e. which require sufficient amounts of memory as to cause contention in the system to resort to backing the memory onto disk storage) the emergent behavior of the system 100 mitigates the rapid oscillations, which can occur in a "swap storm". In addition although some disk space is typically designated exclusively for "swap space" (such as in the storage 120) there is likely further available space. As such, the methods, systems and computer program products described herein can track the swapping behavior of processes, such as by tracking the number of page faults per time slice as described further herein. Rather than killing the process a performed conventionally by operating systems, the methods, systems and computer products described herein penalize the process, thereby creating a peaceful manner in achieving system stability. In addition, the operating system 111 can be extended to "freeze" processes to this disk and "thaw" them when real memory is available.

The operating system 111 includes multiple metrics for determining the order in which to run processes. Such metrics include but are not limited to historical usage of the process, type of usage, priority of the usage and "niceness" of the usage. As described herein, the system scheduler 112 implements these metrics in order to determine how the processes are scheduled. In exemplary embodiments, the methods, systems and computer program products described herein extend the system scheduler metrics to react to the overall memory requirements of a process relative to the available storage that is available for swapping. As such, the system scheduler 112 determines how much of a given process must be swapped in and out of the storage medium in order for the process to execute. The processes that are using more than a predetermined amount of memory and are utilizing system resources beyond a pre-determined threshold are penalized. Penalizing the aforementioned of processes results in the processes having less execution time and prevents the memory 110 from being overrun as rapidly by the processes as before the initiation of the penalization.

In further exemplary embodiments, an operator of the system 100 can be given the option to "freeze" these processes and write them to a file system (e.g., to the storage 120) even if the area on the storage 120 (e.g., disk space) is not explicitly designated for such a purpose. This option allows an administrator the flexibility to temporarily manage the culprit processes while not forcing the administrator to explicitly designate disk resources. It is appreciated that this option can prevent the processes from seeing even more memory, which can result in those processes over-utilizing the new resource. Once the system 100 has become more stable, the system administrator can then have the option to thaw the processes from the designated storage space and allow the processes to run as prior to the freezing.

In exemplary embodiments, through the dampening effect of penalizing swap-heavy processes as described herein, which slows down the swapping that can cause a swap storm, the scheduler can devote time to processes that are not swapping, such as shells and utilities used to potentially kill the offending swappers. It is appreciated that during a swap storm, there may not exist sufficient system resources to launch the shells and utilities to kill the offending processes, yet this scenario may be overcome by requiring certain pages backing the processes that operate on the swap intensive processes to be pinned and locked into memory such that they will themselves never be a participant in a swap storm, thus ensuring their continued availability at run time even under swap storm circumstances. In further exemplary embodiments, processes are marked with a swap penalty. As the processes are marked with the swap penalty, a lifetime swap score can be kept such that processes can be frozen automatically when their respective swapiness is too high as further described herein.

Figure 2:
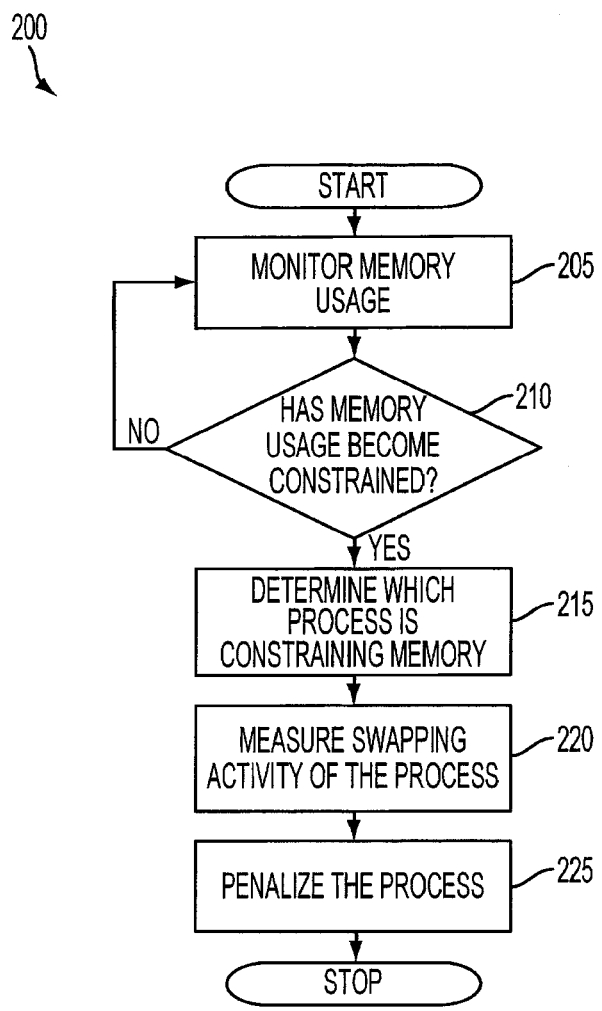
FIG. 2 illustrates a flow chart for a swapping activity scheduling penalization method in accordance with exemplary embodiments.

FIG. 2 illustrates a flow chart for a swapping activity penalization method 200 in accordance with exemplary embodiments. In exemplary embodiments, at block 205, the OS 111 monitors memory usage of the system 100. At block 210, the OS 111 determines whether or not the memory 110 has become constrained. If the memory 110 has not become constrained, then the OS 111 continues to monitor memory usage at block 205. However, if the OS 111 has determined that the memory 110 has become constrained at block 210, the OS 111 determines which processes are the culprits using existing heuristics and mechanisms at block 215. It is appreciated that currently, if a process is constraining memory, the operating system simply kills the process without any elegant memory freeing resolution. At block 220, once the OS 111 has identified the process that is constraining the memory 110, the system 100 measures and quantifies the process's swapping activity with existing heuristics at block 220. The swapping activity is given a value which is then used as a variable in scheduling algorithms. In exemplary embodiments, the system 100 can reduce the process's priority and time given to run, which is one form of penalization at block 225. In exemplary embodiments, if the memory constraint problem is not resolved after penalization of the offensive process(es), the user can then use another program to make a decision about how they want to handle these processes (e.g., either kill or freeze them and make their own priority calls).

In exemplary embodiments, to determine the penalization for a process, several structures can be set up in the memory 110 so that the system scheduler 112 can make determinations on when and how to penalize a process. In tracking the swapping activity and attributes of the process, the OS 111 can set up an object (i.e., data structure) in the memory 110 that stores the attributes of the process. As such, each task is represented as an object called a task_struct as is common in the literature. This object typically has attributes of the process like priority, time slice, process ID number, state, name, parent process (if any), and children (if any). For illustrative purposes the data structure is referred to as task_struct. In exemplary embodiments, the number of page faults/time slice (PFs/TimeSlice) can be tracked by a counter stored in task_struct, referred to as $PFPT for illustrative purposes. In addition, a watermark or threshold can be set at an unacceptable value for PFs/TimeSlice, which may be system global variable. In exemplary embodiments, an instance of this value is associated with any given process and stored in the respective task_struct for the process. In exemplary embodiments, a counter for how many consecutive times slices a process should be executed when it is finally granted permission to run can further be stored in the memory 110. For illustrative purposes this counter is referred to as $Tick. In exemplary embodiments, the system 100 can further set up a penalty queue in the memory 110, which holds pointer to task_structs of offensive processes. In exemplary embodiments, the memory 110 can further include a counter for how many times a task should be skipped (i.e., penalized). This counter is stored in the memory 110 along with a pointer to the task_struct of the offending process, which are both contained in the penalty queue. For illustrative purposes, this counter is referred to as $Skip. In exemplary embodiments, the task_struct for each process can further include a limit on what the maximum time slice for a process can be. In exemplary embodiments, the tasks (processes) that are actively accessing memory are stored in an active queue in the memory 110. In exemplary embodiments, an expired queue holds the tasks that have been executed before some other process in the active queue which has not yet been run but is eligible.

Figure 3:
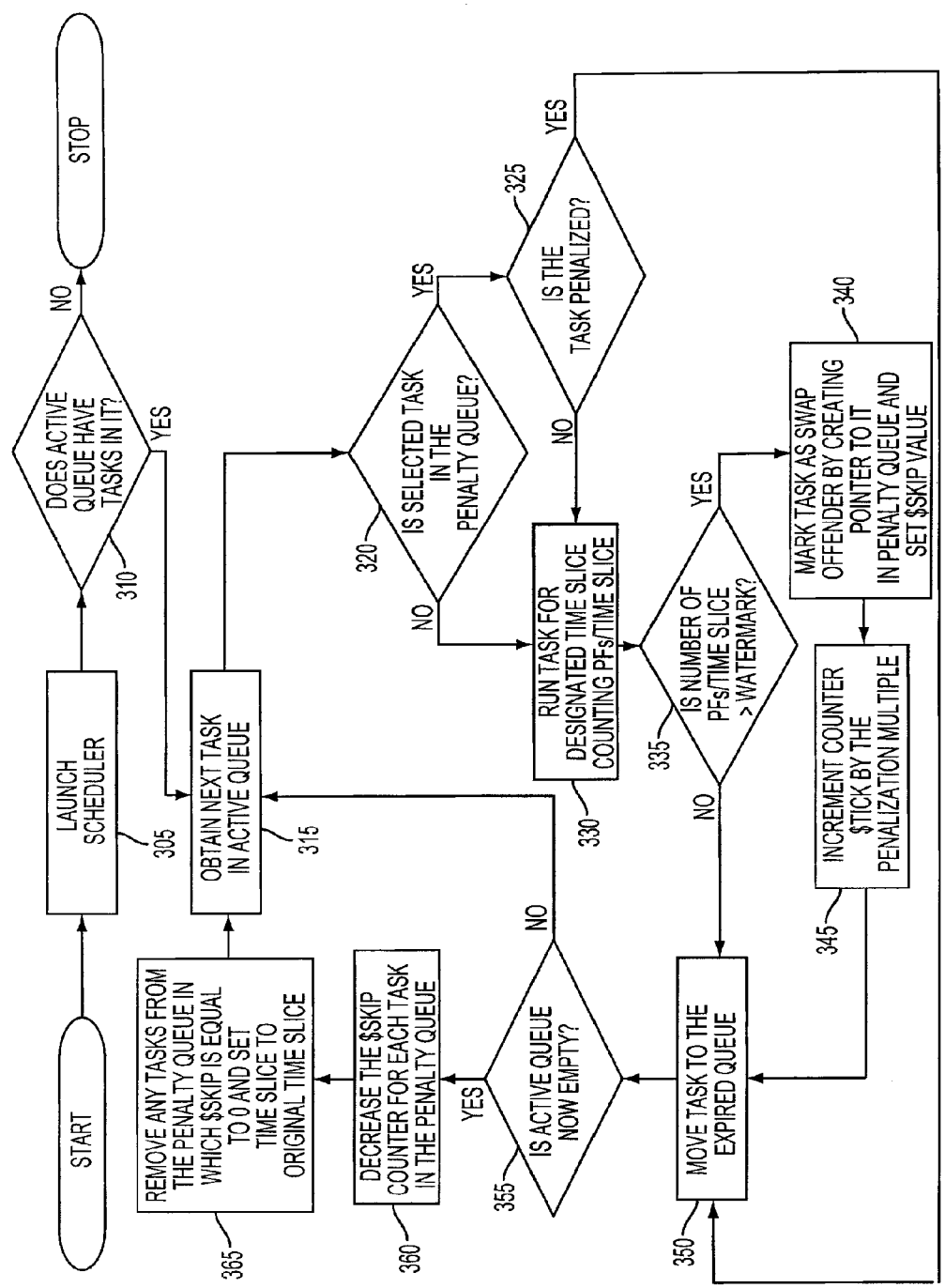
FIG. 3 illustrates a flow chart for a swapping activity penalization management method in accordance with exemplary embodiments.

FIG. 3 illustrates a flow chart for a swapping activity penalization management method 300 in accordance with exemplary embodiments. It is appreciated that the method 300 is an example and that there are other methods for managing swapping activity penalization contemplated in other embodiments. The active queue holds all the upcoming tasks that have not been processed in a given iteration of processing through the active task lists (i.e., the list of processes eligible to run before other processes may run a second consecutive time). At block 305, the system 100 launches the system scheduler 112. At block 310, the system scheduler 112 determines if the active queue has tasks in it. If the active queue does have tasks in it at block 310, then at block 315, the system scheduler 112 obtains the next task in the active queue. At block 320, the system scheduler 112 determines if the penalty queue has more than one task in it. If there is not more than one task in, the system 100 runs the task for the designated time slice and counts the page faults per time slice at block 330. If at block 320, the penalty queue does have more than one task in it, then at block 325, the system scheduler 112 determines if the task is penalized. If the task is not penalized that block 325, then the system 100 runs the task for the designated time slice and counts the page faults per time slice at block 330. If at block 325, the task is penalized, then the task is moved to the expired queue at block 350.

Returning to block 330, when the task is run for the designated time slice and the page faults per time slice are counted, then at block 335, the system scheduler determines if the number of page faults per time slice is greater than the predetermined watermark. If the number of page faults per time slice is greater than the predetermined watermark at block 335, then at block 340, the task is marked as a swap offender by creating a pointer to that task in the penalty queue. At block 345, the counter $Tick (which represents the number of consecutive time slices to occupy when this process is next allowed to run) is incremented by a value suitable for fine tuning operating behavior (a value such as 1 is the reasonable minimum) but more advanced calculations based on previous penalization may be taken into consideration to change the weighting multiple. It should be appreciated that such a multiple is likely to be artificially capped in order to deter an errant process from accumulating enough execution credits ($TICK) to effective starve other processes by performing unusually long execution that degrades system performance to a degenerate batch operation. This same multiple value is set for the $SKIP value of the process, which indicates the number of consecutive times the process should be skipped when it would otherwise normally be eligible and chosen for execution. The task is then moved to the expired queue at block 350. If the number of page faults per time slice is not greater than the predetermined watermark at block 335, then the task is moved to the expired queue at block 350.

The system scheduler 112 then determines if the active queue is empty at block 355. If the active queue is not empty at block 355, then the system 100 obtains the next task in the active queue at block 315 and the subsequent blocks are repeated. If the active queue is empty at block 355, then at block 360, the system scheduler 112 decreases the $Skip counter by 1 for each task in the penalty queue. At block 365, the system scheduler 112 removed any tasks from the penalty queue in which $Skip (which indicates the number of consecutive times the process should be skipped when it would otherwise normally be eligible and chosen for execution) is equal to 0. The formerly offending process is now eligible for execution when it is next encountered in the active list. After execution has commenced for $Tick number of consecutive scheduler time slices, the system scheduler sets the time slice to the product of $Tick and the system default time slice When the active queue is empty, the expired queue becomes the active queue and vice versa. The method then continues at block 315 in which the system 100 then obtained the next task in the active queue (formerly the expired queue). It is appreciated that the method 300 continues indefinitely monitoring and managing processes as described herein. It is appreciated that there is a check for more than one task in the penalty queue because two processes contending for memory cause a swap storm. In exemplary embodiments, $Tick is set to one and $Skip is set to zero.

It is therefore appreciate that the method 300 determines if more than one task is contending for RAM. This determination occurs each time after the active and expired queues are swapped. Furthermore, the determination is made by checking if there is more than one pointer to a task in the penalty queue. When there are two or more tasks that are using large amounts of memory, they end up bumping out the other tasks from RAM onto disk storage. When this event occurs, then the system 100 knows that a swap storm is occurring. For example, the system 100 may have a total of 2 GB of RAM. Tasks A and B each require 1.5 GB. Task A has the first chance to run and uses its 1.5 GB. Task B then runs and it has to swap out 1 GB of A's memory out to disk and retrieves its pages. Each time B has to go out to disk, the page fault counter is incremented. In exemplary embodiments, the method 300 is implemented and the comparison of page faults/time slice is made. Task B would be marked as an offender, and tagged in the penalty queue. Then when Task A runs again, Task A would run into the same problem that Task B ran into, because it now has to swap out Task B's memory, and retrieve it's own from disk storage. Now A is marked as an offender as well. In exemplary embodiments, now that there are two tasks in the penalty queue, the method 300 gives each task more consecutive time to run, but holding off on how often it runs. In exemplary embodiments, one effect of the penalization is that the interactivity of the task is reduced in which the offending task is run more continuously thereby reducing the interactivity of a user with the task.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A memory management method, comprising:
   identifying a first process from an active queue;
   identifying a second process from the active queue;
   tracking attributes associated with the first and second processes, the attributes comprising at least one of priority, time slice, process ID number, state, name, parent process, and child process;
   determining, by a scheduler of an operating system, whether one of the first and second processes is constraining system memory, the system memory determined to be constrained if the one of the first and second processes uses greater than a pre-determined amount of memory or utilizes system resources beyond a predetermined threshold value;
   marking, by the scheduler, the one of the first and second processes as a penalized process in response to determining that the one of the first and second processes constrains the system memory, the scheduler configured to perform one of a plurality of actions with respect to the penalized process, the actions comprising writing the penalized process to a separate temporary storage location and reducing a scheduling priority associated with the penalized process, wherein one of the plurality of actions is selected as a function of the tracked attributes of the one of the first and second processes; and
   running the other of the first and second processes;
   wherein upon determining, responsive to performing the one of the plurality of actions, the penalized process continues to constrain the system memory, freezing the penalized process until memory becomes available or ending the penalized process.

2. The method as claimed in claim 1 further comprising measuring the swapping activity of the first and second processes.

3. The method as claimed in claim 1 wherein the one of the first and second processes is marked as the penalized process when the one of the first and second processes experiences a number of page faults that exceeds a predetermined threshold in a given time period.

4. The method as claimed in claim 3 further comprising marking the one of the first and second processes as an expired process.

5. The method as claimed in claim 1 wherein running the other of the one of the first and second processes is performed upon determining the other of the one of the first and second processes is not marked as the penalized process.

6. A computer program product for providing memory management, the computer program product including a storage media for storing instructions for causing a computer to implement a method, the method comprising:
   identifying a first process from an active queue;
   identifying a second process from the active queue;
   tracking attributes associated with the first and second processes, the attributes comprising at least one of priority, time slice, process ID number, state, name, parent process, and child process;
   determining, by a scheduler of an operating system, whether one of the first and second processes is constraining system memory, the system memory determined to be constrained if the one of the first and second processes uses greater than a pre-determined amount of memory or utilizes system resources beyond a predetermined threshold value; and
   marking, by the scheduler, the one of the first and second processes as a penalized process in response to determining that the one of the first and second processes constrains the system memory, the scheduler configured to perform one of a plurality of actions with respect to the penalized process, the actions comprising writing the penalized process to a separate temporary storage location and reducing a scheduling priority associated with the penalized process, wherein one of the plurality of actions is selected as a function of the tracked attributes of the one of the first and second processes; and
   running the other of the first and second processes;
   wherein upon determining, responsive to performing the one of the plurality of actions, the penalized process continues to constrain the system memory, freezing the penalized process until memory becomes available or ending the penalized process.

7. The computer program product as claimed in claim 6 wherein the method further comprises measuring the swapping activity of the first and second processes.

8. The computer program product as claimed in claim 6 wherein the one of the first and second processes is marked as the penalized process when the one of the first and second processes experiences a number of page faults that exceeds a predetermined threshold in a given time period.

9. The computer program product as claimed in claim 8 wherein the method further comprises marking the one of the first and second processes as an expired process.

10. The computer program product as claimed in claim 6 wherein the running the other of the one of the first and second processes is performed upon determining the other of the one of the first and second processes is not marked as the penalized process.

11. The method as claimed in claim 1 further comprising scheduling an order to run the first and second processes based on historical usage, type of usage, and priority of usage.

12. The method as claimed in claim 1 further comprising devoting time to at least one of a shell and a utility that is not swapping, wherein the at least one of a shell and a utility is used to kill an offending swap process.

13. The method as claimed in claim 12 further comprising pinning and locking into the system memory a page associated with the at least one of a shell and a utility to ensure an availability of the at least one of a shell and a utility.

14. The computer program product as claimed in claim 6 wherein the method further comprises scheduling an order to run the first and second processes based on historical usage, type of usage, and priority of usage.

15. The computer program product as claimed in claim 6 wherein the method further comprises devoting time to at least one of a shell and a utility that is not swapping, wherein the at least one of a shell and a utility is used to kill an offending swap process.

16. The computer program product as claimed in claim 15 wherein the method further comprises pinning and locking into the system memory a page associated with the at least one of a shell and a utility to ensure an availability of the at least one of a shell and a utility.

17. The method as claimed in claim 1, wherein penalizing the one of the first and second processes comprises running the one of the first and second processes in a continuous mode such that the one of the first and second processes runs consecutively in time with respect to the other of the first and second processes.

18. The method as claimed in claim 17 wherein the continuous mode limits interactivity from a user.

19. The computer program product as claimed in claim 6 wherein penalizing the one of the first and second processes comprises running the one of the first and second processes in a continuous mode such that the one of the first and second processes runs consecutively in time with respect to the other of the first and second processes.

20. The computer program product as claimed in claim 19 wherein the continuous mode limits interactivity from a user.

* * * * *